July 11, 1939.   E. A. FRANCE   2,165,845
MECHANICAL PACKING
Filed Nov. 3, 1936
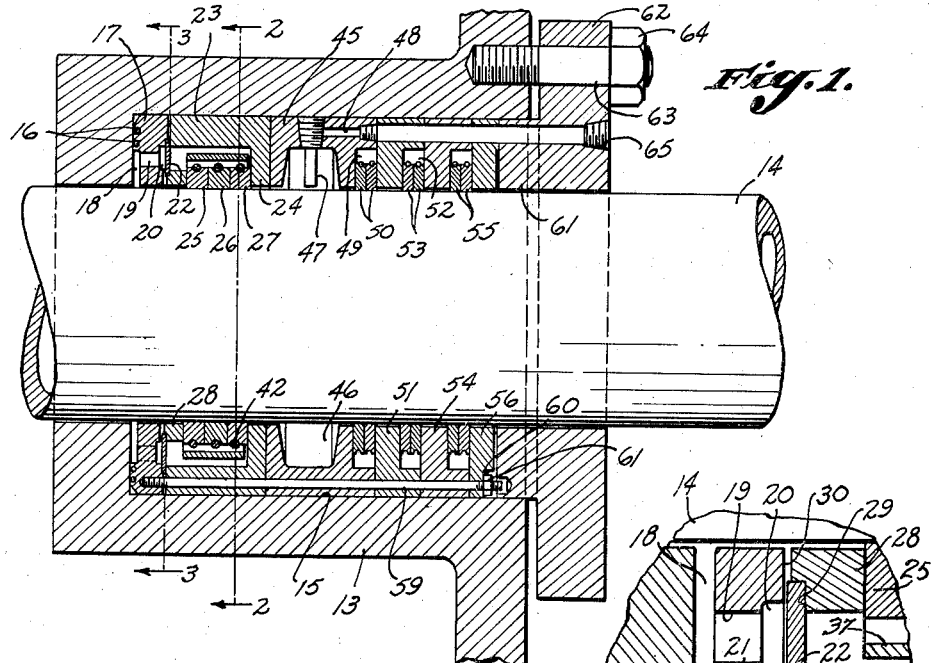
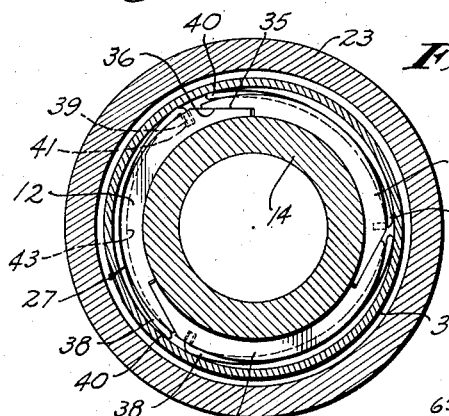
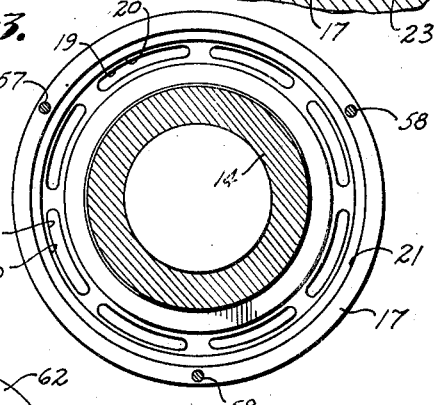
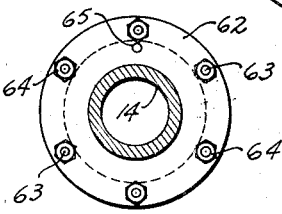
INVENTOR.
Edwin A. France,
BY Russell M. Otis
ATTORNEY.

Patented July 11, 1939

2,165,845

UNITED STATES PATENT OFFICE 2,165,845

MECHANICAL PACKING

Edwin A. France, Philadelphia, Pa.

Application November 3, 1936, Serial No. 108,994

6 Claims. (Cl. 286—20)

My invention relates to packing for the rods of gas engines, steam engines, compressors, and the like, to prevent leakage of fluid along the rods.

An object of my invention is to provide a packing that will prevent leakage of fluid under all conditions of pressure and temperature likely to be encountered in practice.

Another object is to provide a packing which bears on the rod with a substantially constant force regardless of the pressure of the fluid against which the packing operates.

Another object of the invention is to provide a packing which operates to prevent leakage at very low pressures which are insufficient to exert sufficient force on the commonly employed packings to prevent leakage.

Another object is to provide a packing which has ample provision for conducting heat away from parts thereof which are subjected to the greatest heat, whereby burning, warping, pitting, and undue expansion of the parts is avoided.

A further object is to provide in a packing, a means for lubrication which does not become clogged by accumulation of carbon in the packing.

Another object is to provide a packing having a series of rings around the rod which are urged more tightly together by increasing fluid pressure through action on a resilient diaphragm and which packing is so constructed that should the diaphragm fracture, the packing will continue to function without disastrous results.

Still another object of the invention is to provide a packing that is easy to assemble and convenient to install and is economical and of long life.

These and other objects I attain in a manner that will be clear from consideration of the following description taken in connection with the accompanying drawing, of which:

Fig. 1 is a cross-sectional view of my packing installed in the stuffing box of an engine.

Fig. 2 is a sectional view of the installed packing taken along the line 2—2 of Fig. 1.

Fig. 3 is a sectional view of the installed packing taken along the line 3—3 of Fig. 1.

Fig. 4 is a view of the front of the installed packing with the enclosed rod in section.

Fig. 5 is a partial sectional enlarged view of a portion of my packing as installed.

My packing is of the general type known as floating metallic packing, although in many instances, where the temperature conditions permit, the parts of the packing bearing on the rod may be made of Bakelite, carbon, etc. This type of packing commonly employs rings of the kind shown in Fig. 2 and formed of three sections 10, 11, and 12 which are ordinarily held together by a garter spring. In the present invention I have provided an improved means of resilient mounting, but the use of divided rings of this general type is old. As ordinarily employed in a gas engine, for example, several pairs of these divided rings are placed in individual recesses around the rod to be packed and are held in contact with the rod by the garter springs or, in the case of rings subjected to high temperatures, by heat resisting springs such as cast iron contracting snap springs. The invidual rings move as required, and the various sections of each ring expand and contract to suit the varying diameter of the moving rod. In such a simple structure, as the pressure increases, as at the time of firing, to a very high value, the hot gases make their way between the rings to the space behind and act on the outer peripheral surfaces of the rings to press them with enormous force against the rod. This results in a large frictional force between the rod and the rings and is aggravated in most engines by the fact that this large force is most in evidence when the crank is near dead center at which time the velocity of the rod is little or nothing and the coefficient of friction is highest. These factors combine to cause a great waste of energy which evidences itself partly in excessive heating of the packing and rod, which in turn results in short life of the equipment. The effect of these forces is readily observed by inspection of a rod which has been long employed in connection with a packing of the variety commonly employed. It is found in such cases that the rod is "shouldered" or annularly grooved due to excessive wear at a point corresponding to the cylinder end of the packing when the rod is in position corresponding to the moment of firing of the engine. The cylinder end of the packing is subjected to the greatest pressure and naturally the greatest wear occurs at that point.

By the construction employed in my invention these difficulties are avoided and I secure a substantially constant pressure of the rings against the rod. I here illustrate my invention in connection with an engine having a frame 13 through which passes a piston rod 14 which is generally made hollow, as shown, to be cooled by water. Surrounding the rod 14 is a cavity or stuffing box 15 in the engine frame in which the packing resides. My packing preferably comprises several units which are clamped together. Seating on the inner end of the stuffing box through copper gaskets 16 is an annular member 17 having clearance over the shaft 14 and being of approximately the same outside diameter as the diameter of the stuffing box. The member 17 has an annular recess 18 in the end facing the engine wall, which recess extends to the inner diameter of member 17 and therefore communicates with the space immediately surrounding the rod 14. Connecting with the recess 18 and passing through the member 17 are a plurality of elongated circumferentially disposed passages 19 which connect with an annular groove 20 in face of member 17 opposite the recess 18. The member 17 is recessed at 21, as best seen in Fig. 5, for reception of a diaphragm 22 in the shape of a flat ring. The diaphragm 22 is flexible and is preferably made of a resilient metal such as steel or a ferrous alloy of suitable thickness to withstand the contemplated pressures without buckling. The diaphragm is of such width that it extends inwardly further than the passage 20 so that it covers it, and is held in this position by being clamped stationary at its outer edge between the annular member 17 and the cylindrical shell 23 of approximately the same outside diameter as the member 17. The shell 23 is formed with an inwardly directed flange 24 which has clearance over the rod 14. In the space within the shell 23 surrounding and bearing on the rod 14 are expansible packing rings 25, 26, and 27, the latter lying in contact with the flange 24 which serves as an abutment therefor to restrict movement of the packing rings in one direction. Between the ring 25 and the diaphragm 22 and in contact with both is a ring 28 which has clearance over the rod 14 and which is recessed at one corner 29 to receive the inner edge of the diaphragm 22 with which it is in sealing contact.

When the whole structure is tightened together the dimensions of the various parts may be such that the diaphragm 22 is undeflected, but preferably it is deflected toward the member 17 at its inner edge. In any case, the deflection is preferably not great enough to bring the diaphragm into engagement with the surface 30 of the member 17. To assure axial freedom of movement of the packing rings due to expansion and to yet limit the possible separation of the rings in case of breakage of the diaphragm, the inner portion of the member 17 adjacent the diaphragm is relieved to make the distance between the abutting surface 30 and the diaphragm less than .025 inch. The recess 29 of ring 28 is not as deep as the diaphragm is thick, so that there is a slightly greater separation between surface 30 and the ring 28 than between surface 30 and the diaphragm.

The packing rings 25, 26, and 27 are of identical construction except that I prefer to make rings 25 and 27 of iron or some ferrous alloy and the ring 26 of bronze. I find that these materials work well together under conditions where there is defective lubrication, and the ferrous metal ring 25 closest to the cylinder withstands the action of the hot gases existing at that location better than one of bronze or similar metal.

Fig. 2 illustrates the manner in which the expansible packing rings are assembled in a unit. Each ring is preferably made in three sections such as 10, 11, and 12 which overlap one another to substantially form a complete ring which is expansible within limits by the sections sliding on one another as at adjacent surfaces 35 and 36. The individual ring sections 10, 11, and 12 are retained in the form of a ring, and the three rings 25, 26, and 27 are held adjacent one another and within the band 37 by the reaction springs 38. These springs 38 are constructed of stiff wire to form elongated rods of suitable characteristics to cause the packing rings to bear on the enclosed piston rod with a predetermined pressure which is sufficient to substantially prevent leakage of fluid along the rod and to prevent the rings being expanded by the fluid under pressure acting in the small spaces between the ring sections. The springs may be of circular or rectangular or any other suitable cross-section. Each of the springs 38 is bent at right angles at one end, to form a projection 39 and is preferably tapered slightly at the other end, as at 40. Each of the ring sections has a hole or socket 41 on its outer periphery near one end, into which the bent down portion 39 of one of the springs 38 is placed. The spring, which is preferably bent into an arcuate shape of greater radius of curvature than the ring on which it is to be placed, is then aligned with the peripheral groove 42 of the ring section and is deflected along with the springs on the other two sections of the ring until the whole will slip into the band 37. In this manner the three rings 25, 26, and 27 are assembled within the band 37. When installed the middle portions of the springs 38 generally engage the ring sections as at 43 within the grooves 42 while the ends 40 engage the inner surface of the band 37. The projections 39 residing in the sockets 41 prevent relative circumferential movement between the ring sections and the springs. The result of this construction is a convenient packing ring unit comprising a plurality of expansible rings each individually movable. The band 37 is not engaged by any part of the packing except the reaction springs within, so the unit as a whole is free to move as demanded by the irregularity of motion of the rod, etc.

I may vary this construction by anchoring the springs 38 at different locations along the ring sections 10, 11, and 12. For example, I may locate each socket 41 midway between the ends of each ring section and allow each of the springs 38, which are anchored in the sockets 41, to extend over the joint between the corresponding ring section and the next and bear, at the end of the spring, upon the interior surface of band 37 at a point near the middle of the next ring. Since each spring 38 at its middle lies in the peripheral groove 42, this construction results in each spring tending to bear on two ring sections.

Adjacent the flange 24 is the section 45 of approximately the same outside diameter as the shell 23 and having clearance over the rod 14. The section 45 is recessed to form an annular chamber 46 surrounding the rod. At the top and extending into the chamber 46 is a tubular oil dropper 47 which communicates with an axially directed passage 48 through which the dropper receives its supply of oil. Oil droppers are ordinarily very short and terminate close to the surface through which they project. As a result they become crusted over with an accumulation of carbon and will no longer allow the oil to pass. I make my oil dropper long so that there is no danger of carbon encrustations enveloping the whole dropper, and I bring the end of the dropper down almost to the rod 14 so that oil that issues in drops from the end of the dropper is wiped off by the moving rod. By this means I assure an uninterrupted supply of lubricating oil to the moving rod.

The section 45 is also recessed at 49 to receive the expansible sealing rings 50. The recess 49 is of a depth equal to the combined thickness of the rings 50 plus the desired clearance. The rings 50 are generally similar to the rings 25, 26, and 27 except that the sections thereof are held together by garter springs around their peripheries instead of with the springs 38.

Adjacent the section 45, and retaining rings 50 in the recess 49, is the spacer 51 of approximately the same outside diameter as the section 45 and having clearance over the rod 14. This spacer is formed with a recess 52, similar to the recess 49, to receive the sealing rings 53 similar to the rings 50. Adjacent the spacer 51 is the spacer 54 which is similar to the spacer 51 and which is recessed to receive the sealing rings 55 which are also similar to the rings 50. Adjacent the spacer 54, and retaining the rings 55 in their recess, is the plate 56 of approximately the same outside diameter as the spacer 54 and having clearance over the rod 14. For convenience in installation the member 17, diaphragm 22, shell 23, section 45, spacer 51, spacer 54, and plate 56 are all clamped together by three studs 57, 58, and 59 which pass through all of these parts except the diaphragm and are screwed into the member 17. The plate 56 is recessed as at 60 to accommodate nuts as 61 which are screwed onto the studs to clamp the structure together.

A cylindrical member 61 having an outside diameter approximately equal to that of the plate 56 and having clearance over the rod 14 lies adjacent the plate 56 and carries a cylindrical flange 62 through which a plurality of studs 63 project from the engine frame 13. Nuts 64 threaded on the studs 63 are tightened to clamp the entire structure together and tightly against the bottom of the stuffing box. The spacers 51 and 54, the plate 56, and the member 61 are drilled to form a passage which is a continuation of the passage 48, and the termination of that passage in the member 61 is threaded at 65 to receive a fitting for supply of oil to the packing.

In operation, the hot gases under high pressure, attempting to escape along the rod 14, enter the recess 18 and pass through the passages 19 and 20 and exert their pressure on the flexible diaphragm 22. Since the diaphragm is clamped tightly at its outer edge the gases cannot escape at this point and can only deflect the unsupported inner portion of the diaphragm in the direction of the packing rings 25, 26, and 27. Since the resilient diaphragm 22 is preferably pressed tightly against the ring 28 by reason of the prior deflection of the diaphragm and is still more tightly pressed thereagainst by the gas pressure, the gas cannot pass between these two parts. Gas which follows along the rod 14 cannot pass between ring 28 and packing ring 25 because these are pressed tightly together in sealing contact by reason of the action of the gas on the diaphragm. In like manner any gas that succeeds in passing along the rod 14 under the rings 25, 26, or 27 cannot pass between these rings or between ring 27 and the flange 24 because the adjacent surfaces are so tightly pressed together by reason of the pressure of the gas on the flexible diaphragm 22.

The tendency of the gas to escape is proportional to the pressure of the gas, but the tightness with which all the adjacent surfaces of the packing rings are pressed together also is proportional to the pressure and results in practically no leakage therebetween at any pressure. Because of this situation the hot gas under high pressure has no access to the region between the rings and the shell 23 and cannot press the packing rings 25, 26, and 27 with more force against the rod 14 as is done in ordinary packings. Thus the packing rings 25, 26, and 27 bear with a predetermined pressure on the rod 14, which pressure is determined by the tension of the springs 38 and the dimensions of the structure. Another advantage of my construction is that the hot gases are confined to a zone near the water-cooled rod 14 or in passages 18, 19, 20 where their heat may be readily conducted away to the large engine frame through the member 17 or the diaphragm 22 and the shell 23.

The gas which escapes along the rod under rings 25, 26, and 27 comes into the chamber 46 and because of the relatively large absorbing surface of this chamber, which incidentally is left un-machined in order that its roughness may contribute to its absorbing ability, the gas loses a large share of its heat in this location, which heat is conducted away to the engine frame through the large sections of metal there provided. The gas then is blocked by the multiple sealing rings 50, 53, and 55, which do not have any provision for preventing the gas from getting behind the rings because the pressure of the gas at this location is so small as to not produce any objectionable increase in force on the rod.

Should the diaphragm crack, the rings 28, 25, 26, and 27 are simply permitted space between them which is limited by the space between surface 30 and diaphragm 22. This space is not sufficient to provide an abnormal clearance between the rings, that is any clearance which will permit objectionable oscillatory movement of the rings. Should the diaphragm break into pieces and fall out of position, the abutment of the ring 28 against the surface 30 of member 17 will still retain the packing rings in operative position. This feature constitutes a very important safeguard.

Instead of making the shell 23 and section 45 separate, I may make them of one piece of metal. Or I may employ a different number of packing rings within the band 37, or a plurality of units such as that constituted by the member 17, diaphragm 22, ring 28, shell 23, and enclosed packing rings. The whole packing may be lengthened or shortened by the inclusion of more, or the elimination of some, of the more or less standard sealing ring units such as 55 and their accompanying spacer 54. The packing composed of member 17, diaphragm 22, ring 28, shell 23 and the enclosed packing rings may be efficiently employed separately or together with the section 45, or it may be employed with any other suitable sealing unit which may be substituted for the remainder of the packing.

It is understood that various other changes and modifications in design and construction may be made by those skilled in the art without departing from the spirit of the invention defined in the appended claims.

What I claim is:

1. A mechanical packing for a rod including an expansible packing ring adapted to bear on said rod and supported against axial movement in one direction, an annular flexible diaphragm supported stationary at one edge thereof and having one side in communication with the space around said rod, and a ring interposed in sealing contact with both said packing ring and an unsupported portion of said diaphragm, whereby increased pressure in said space increases the tightness of said sealing contact, said ring being limited in its movement toward said packing ring only by contact with said packing ring.

2. A mechanical packing for a rod including a plurality of expansible packing rings adapted to bear on said rod, an abutment restricting axial movement of said packing rings in one direction, a stationary annular member adapted to surround said rod, an annular flexible diaphragm supported at the outer edge thereof stationary with respect to said annular member and said abutment, and a stationary abutting surface limiting the movement of said diaphragm in the direction of said annular member, said annular member having passages therethrough in communication with the space around said rod and with one side of said diaphragm, and the inner unsupported portion of said diaphragm being adapted upon increasing pressure in said space to press said packing rings more tightly together to prevent leakage therebetween and being restricted in said pressing only by the resistance offered by said packing rings.

3. In a mechanical packing, an expansible peripherally grooved packing ring comprising a plurality of ring sections each of which has a socket in its periphery, a band surrounding said ring and spaced therefrom, and a plurality of springs between said ring sections and the band resiliently retaining the ring in said band, each of said springs consisting of an elongated rod having a projection projecting into one of said sockets and bearing near one end on the inner surface of said band, an intermediate portion of each of said springs lying within said peripheral groove.

4. A mechanical packing for a rod including a plurality of expansible packing rings, said packing rings being independently removable radially and adapted to bear on said rod to prevent leakage of fluid therealong, an abutment restricting axial movement of said packing rings in one direction and in sealing contact with the adjacent packing ring, a stationary annular member surrounding said rod, a resilient annular diaphragm supported at the outer edge thereof stationary with respect to said annular member, a ring interposed between and in sealing contact with said diaphragm and with one of said packing rings, the inner unsupported portion of said diaphragm being deflected toward said annular member by reason of contact with said ring, said annular member having passages therethrough in communication with the space around said rod and with the side of said diaphragm opposite to that contacted by said ring, said ring contacting the adjacent packing ring in such manner as to substantially seal said fluid from access to any surface of said packing ring not perpendicular to said rod, and said ring being restricted in its movement toward said packing rings only by the resistance offered by said packing rings, all in such manner that the packing rings are pressed more tightly together and in contact with said abutment and said ring as the pressure of said fluid is increased but the force with which said packing rings bear on said rod is unaffected by the pressure of fluid in the spaces surrounding the rod at either side of said packing.

5. A mechanical packing for a rod including a plurality of expansible packing rings supported against axial movement in one direction and adapted to bear on said rod, an annular flexible diaphragm surrounding said rod, said diaphragm being supported stationary at the outer edge thereof and having the side thereof farthest from said packing rings in communication with the space around said rod, the inner unsupported portion of said diaphragm being adapted upon increasing pressure in said space to press said packing rings more tightly together to prevent leakage therebetween and being limited in its movement in the direction of said packing rings only by the resistance offered by said packing rings.

6. A mechanical packing for a rod including a plurality of expansible packing rings adapted to bear on said rod, an abutment restricting axial movement of said packing rings in one direction and in sealing contact with one of said packing rings, an annular flexible diaphragm surrounding said rod, said diaphragm being supported at its outer edge stationary with respect to said abutment and having the side thereof farthest from said packing rings in communication with the space around said rod, the inner unsupported portion of said diaphragm being adapted upon increasing pressure in said space to press said packing rings more tightly together to prevent leakage therebetween and being limited in its movement in the direction of said packing rings only by the resistance offered by said packing rings.

EDWIN A. FRANCE.